(No Model.)
L. GIBBS.
LAWN RAKE.
No. 324,374. Patented Aug. 18, 1885.
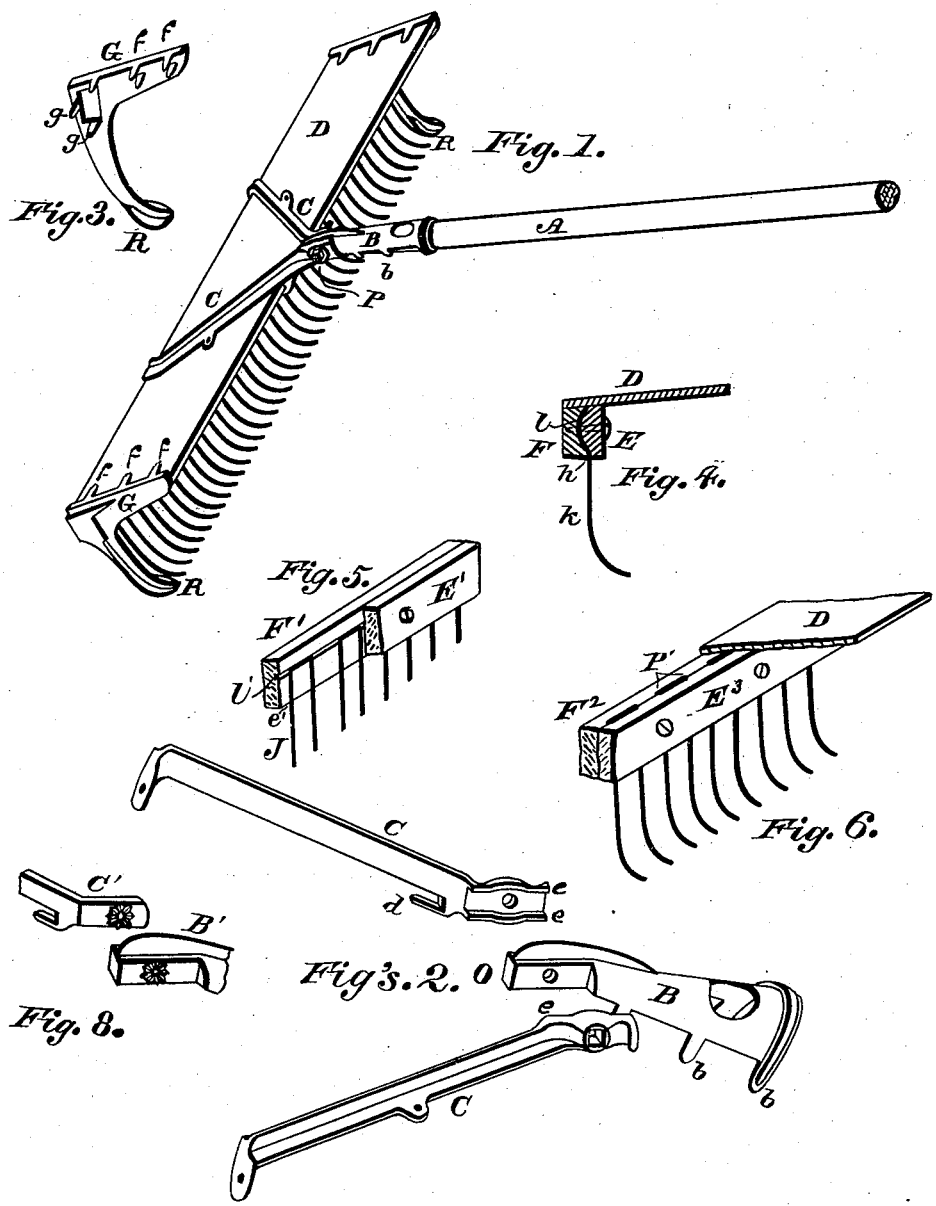
WITNESSES:
INVENTOR
Lewis Gibbs
BY
W. K. Miller
ATTORNEY

UNITED STATES PATENT OFFICE.

LEWIS GIBBS, OF CANTON, OHIO.

LAWN-RAKE.

SPECIFICATION forming part of Letters Patent No. 324,374, dated August 18, 1885.

Application filed May 22, 1885. (No model.)

*To all whom it may concern:*

Be it known that I, LEWIS GIBBS, a citizen of the United States, and a resident of Canton, county of Stark, State of Ohio, have invented a new and useful Improvement in Lawn-Rakes, of which the following is a full, clear, and exact description, reference being had to the accompanying drawings, making part of this specification.

My invention relates to improvements in lawn-rakes, the object being to improve the construction and reduce the cost.

With this object in view my invention relates to means provided by which the handle may be more securely fastened into the socket; also, in providing the socket with removable braces, which may be rigidly attached to the rake, and the joint by which the socket and braces may be connected or disconnected for convenience in handling and shipping; also, in providing certain methods of attaching the teeth to the head, and certain other features of construction and combination of parts, hereinafter described, and pointed out in the specification and claims.

In the accompanying drawings, Figure 1 is a perspective view of my improved lawn-rake. Fig. 2 is a perspective of the handle-socket and braces, showing one method by which the socket and braces may be united. Fig. 3 is a view of the end tooth or shoe, showing the tonguelets by which it is attached to the rake-head, also the sole on the lower curved end, forming a shoe or runner for the support of the rake. Fig. 4 is a transverse section of the rake-head, in which is shown one method of holding and fastening the teeth. Fig. 5 is a perspective showing one method of making the wooden parts of the head and one method of securing the teeth when the teeth are made in sections of two. Fig. 6 is a perspective view showing another method of securing the teeth in the head. Fig. 7 is a view of the lower end of the handle and the handle-socket, showing the groove around the handle and the rib on the socket, hereinafter explained. Fig. 8 is a view of an adjustable method of connecting the handle-socket to the braces.

A represents a wooden handle, that is secured in the skeleton socket by means of the rib $a$ on the inside of the socket and the annular groove $a'$ on the handle, in the following manner: The handle is placed in the socket so as to have the rib rest in the groove. The pending points $b\ b$ may then be brought into such engagement with the handle as to hold it firmly in the socket. The socket B terminates in a shank projection, O, to which the extension-braces C C are adapted, the ledges $e\ e$ engaging with the shank O, forming a socket for the same. The parts may then be secured by the bolt P. By the removal of the bolt the shank may be released and removed from the braces, thus disengaging it with the handle from the rake, for convenience in handling, packing, and shipping. The head of the rake is formed of the pieces D, E, and F, to which are added the end piece, G, with supporting-tooth, and shoe or runner R, which is attached to the head by means of the lips $f\ f\ f$ and the tonguelets $g\ g\ g$.

The handle braces or arm C C may be secured to the head by means of a screw or nail, and to the board D by a rivet and the tongue $d$, which may be bent so as to clamp the under side of the board.

In Fig. 4 is shown one method of forming the head when the teeth consist each of a single piece of wire. The back piece, F, of the head is concave on the front side, and the front piece E convex on the rear side, to conform with the concave in the piece F, which has a series of grooves, $c$, in the face to receive the shank of the teeth. When the teeth have been placed in the grooves, the convex face of the piece E is placed on the teeth, and so held with screws or bolts, forming a clamp by which the teeth are held in position.

Fig. 5 shows the head when made for the reception or use of teeth. When made in sections of two, the back piece, F', is provided with a kerf or groove, $l$, on its front, extending the full length of the piece, and above a line drawn central to and on the face of the piece. This longitudinal groove is intersected by a series of transverse grooves, $l'$, into which the teeth are placed. The grooves are a little less in depth than the diameter of the wire. In this case the rear face of the front piece E' is plain or flat, and, when by the use of screws or bolts is brought to bear on the shank of the teeth as they lie in the grooves, will hold them securely. The teeth J are made in sections of two—that is, one piece of wire forming two teeth—by two parallel sections and one right angle or cross-section.

The head shown in Fig. 6 is composed of the same parts as shown in Fig. 5. They only differ in the matter of detail. The front face of the piece F² is provided with a series of transverse grooves, P', that extend across the face of the piece, and into which the teeth may be placed. The front piece F³ is applied in same manner as shown in Fig. 5; but instead of the longitudinal groove the board D forms the back support for the teeth. The end tooth, K, and plate G are preferably integral, and right and left hand, made of any suitable metal. In the face of the plate G there is a socket to receive the end of the pieces F and E, which extend over the end of the board D to the extent of the depth of the socket, and are clasped by the tonguelets $g\ g\ g$. This tooth is a little longer than the wire teeth, and terminates in a shoe or runner at the lower end. This shoe is formed by extending a rib from the point of the tooth to the upper end of the curved part of the tooth, and on each side of the web or stem of the tooth, forming a broad bottom, on which the weight of the rake is supported, and to receive the blow caused by the fall of the rake when it is thrown out and back in the usual manner of raking, and thus protect the wire teeth. The wire teeth $k$ are formed as shown in the drawings. That in Fig. 4 has a straight section with short curve on the upper end or shank to conform with the concavo-convex surface of the groove $h$, formed by the parts F and E. The lower end of the teeth may be curved or bent in such shape that when the rake is held in working position the points of the teeth will be a short distance above the ground. There is no part of the wire teeth that scrape the surface of the ground, but are held by the end shoe-teeth above, and yet near enough to allow them to pass under the cut grass. By this arrangement of the teeth grass-roots will not be torn out or injured and the rake can be more easily drawn through the stubble.

For the purpose of changing the angle of the teeth the shank of the handle-socket B' may be provided with a circular or partly circular disk with two faces, both of which may be serrated, and on the free end of the arms or braces C' C' are corresponding single-faced disks, serrated so as to engage with the disks on the socket B'. These parts may be held in any desired position by the bolt P; or the disks referred to may be plain, or without the serrations, and the parts may be held in working position by the bolt, and in either case by slacking the bolt the rake-head may be turned so as to give the teeth any desired angle and be retained in that position by the bolt when made tight.

Having thus fully described and set forth my invention, what I claim, and desire to secure by Letters Patent, is—

1. In a lawn-rake, the combination, with a handle-socket having a short shank, of braces removably secured to the opposite sides of said shank, substantially as set forth.

2. In a lawn-rake, a skeleton handle-socket semicircular in cross-section and provided with a semi-annular rib, and a handle adapted to the socket and provided with an annular groove, as shown and described, and for the purpose set forth.

3. In a lawn-rake, the combination, with braces C C, adapted for engagement with the wood-work and provided at their free ends with the ledges $f f$, forming a socket for the reception of the shank, of the handle-socket B and means by which the parts may be held in engagement, as described, and for the purpose set forth.

4. In a lawn-rake, an end tooth, G, terminating in an enlarged bearing or runner and provided with the lips $f$ and tonguelets $g$, substantially as set forth.

5. In a lawn-rake, the combination, with the braces C', adapted for engagement with the wood-work and provided at their free end with serrated disks, of a skeleton handle-socket terminating in serrated disks adapted for engagement with the braces, and means for securing them in the desired working position, as described, and for the purpose set forth.

6. In a lawn-rake, the combination, with the braces adapted for engagement with the wood-work, of a skeleton handle-socket, as described, and means of adjusting the angle of the teeth and securing them in such adjustment, as described and set forth.

7. In a lawn-rake, the head-piece E, provided with a longitudinal groove, $l$, intersecting transverse grooves $l'$, and the clamping-piece E, as shown and described, and for the purpose set forth.

8. In a lawn-rake, the head-piece E, having one side formed in concave and provided with a series of transverse grooves, $l'$, the wire teeth $k$, the shanks of which are bent to conform to the grooves, and the convex clamping-piece E, as described, and for the purpose set forth.

9. In a lawn-rake, the combination of the head-piece having a series of transverse grooves, longitudinal grooves connecting the transverse grooves, the clamping-piece, and the board D, all of the above parts combined substantially as set forth.

In testimony whereof I have hereunto set my hand this 19th day of May, A. D. 1885.

LEWIS GIBBS.

Witnesses:
 CHAS. R. MILLER,
 W. R. MILLER.